March 25, 1969  A. KEVEY  3,435,219
NEUTRON SPECTROMETER FOR HIGH NEUTRON FLUX
Filed Jan. 30, 1967

INVENTOR.
ANDREW KEVEY

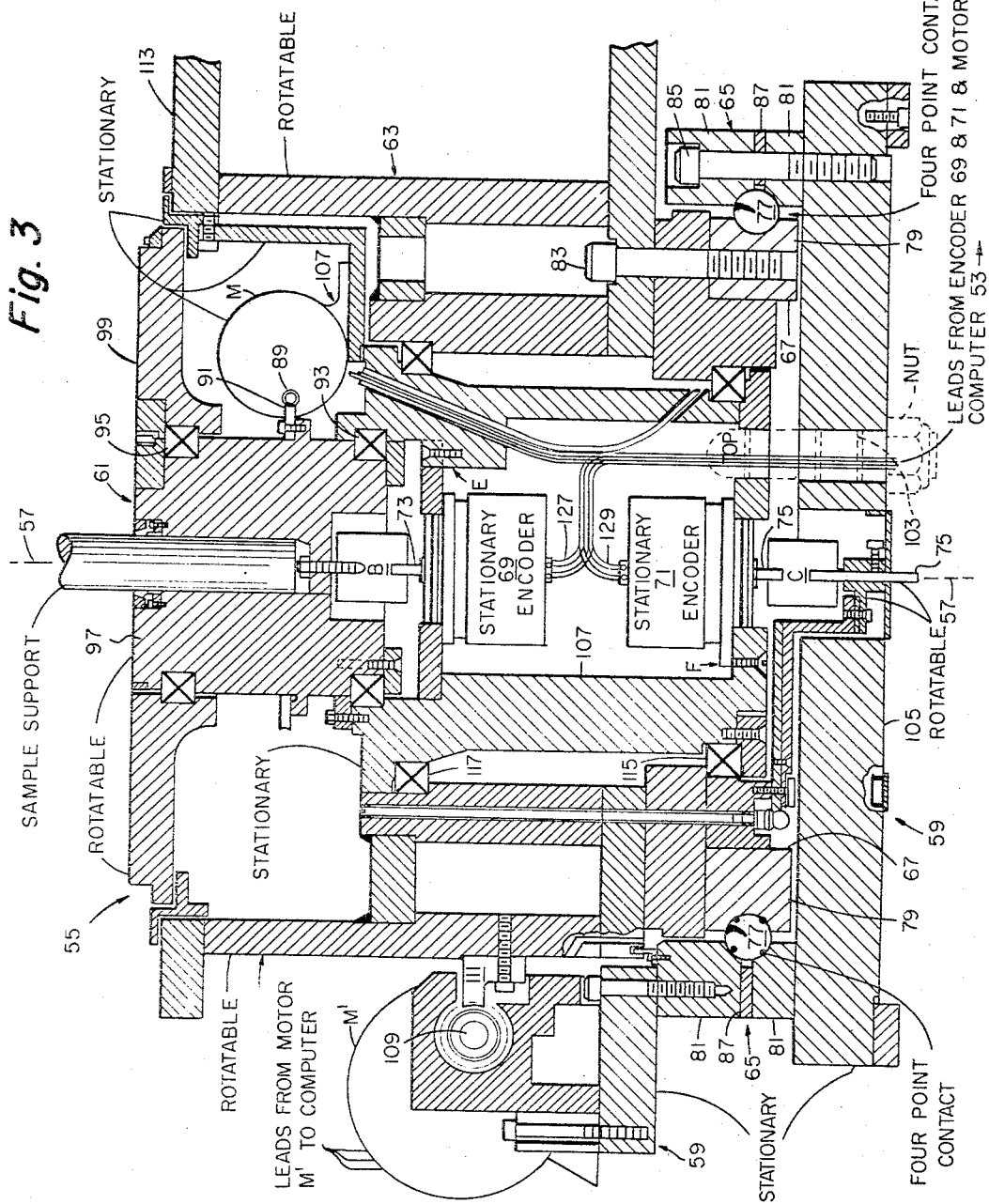

DIFFRACTION CURVE FOR A 1 mm³, BaTiO₃ SINGLE CRYSTAL. WAVE LENGTH 1.16A
(BRAGGS — $\lambda = 2d \sin \theta$)

*INVENTOR.*
ANDREW KEVEY

United States Patent Office
3,435,219
Patented Mar. 25, 1969

3,435,219
NEUTRON SPECTROMETER FOR HIGH NEUTRON FLUX
Andrew Kevey, Setauket, N.Y., assignor to the United States of America as represented by the United States Atomic Energy Commission
Filed Jan. 30, 1967, Ser. No. 613,078
Int. Cl. G01t 3/00
U.S. Cl. 250—83.1                                    5 Claims

ABSTRACT OF THE DISCLOSURE

A neutron spectrometer having a crystal sample, a detector, coaxial, independently rotatable turntables for the crystal and the detector, and precision encoders independently, directly and coaxially connected to each turntable on a common axis for directly, continuously and precisely determining the respective angles between the incident neutrons and the crystal on the one hand and the detector on the other.

Prior art

In neutron spectrometry a need exists for directly determining the relative rotation of a crystal sample and a detector for measuring the neutrons refracted by the crystal. These angles of rotation vary over wide ranges and are of interest especially between 0° and 300° with an accuracy of within .01° or less. Potentiometers for determining the relative rotations do not operate with sufficient accuracy. Other means, such as mechanical monitors that depend on the relative shaft movement of driving motors, are subject to back-lash and other problems related to their indirect coupling through the motor shafts to the rotatable crystal and the detector turntables. It is also advantageous to provide compact, independent, continuously variable drives for rotating inner and outer crystal and detector tables precisely around a common vertical axis on a common base having annular bearing means for a detector table carrying heavy cantilevered loads.

It is an object of this invention, therefore, to provide a compact, practical and accurate neutron spectrometer that overcomes the disadvantage of the prior art by providing coaxial crystal and detector tables having directly driven encoders and independent drives therefor;

It is another object of this invention to provide automatic recording and adjustment of the crystal sample and detector angles;

It is another object to provide neutron spectrometry with a high neutron flux for inelastic scattering analysis;

It is a still further object to provide computer control of a neutron spectrometer.

The invention described herein was made in the course of, or under a contract with the U.S. Atomic Energy Commission.

Brief summary of the invention

The foregoing objects are achieved by supporting inner and outer, co-axial, horizontally rotatable, crystal sample and detector tables from a common base having bearing means for the detector table forming a circular annulus in a plane and including a split race for preloading the bearing means. In another aspect, this invention provides independent drives for the tables, ecoders directly coupled to the tables on a common vertical axis, and a computer coupled to the output from the encoders and the detector, for automatically actuating the turntable drives.

Various other advantages and novel features will now appear from the following description of an embodiment of this invention, and the novel features will be particularly pointed out hereinafter in connection with the appended claims.

Brief description of several views of the drawings

In the drawings where like elements are referenced alike:

FIGURE 3 is a partial cross-section of the sample and detector support system of FIGURE 2;

It is known that high flux beams of neutrons may be produced in a nuclear reactor. A reactor is shown and discussed in U.S. Patent 3,143,478 issued Aug. 4, 1964 by Chernick et al. FIGURE 2 of that patent illustrates various beam tubes that transport constant high flux beams of neutrons up to $7 \times 10^{14}/cm.^2/sec.$ or more in various specific energy bands up to 10 mev. or more. The invention hereinafter described utilizes high flux beams of this type from a reactor of this variety.

Figure 1:
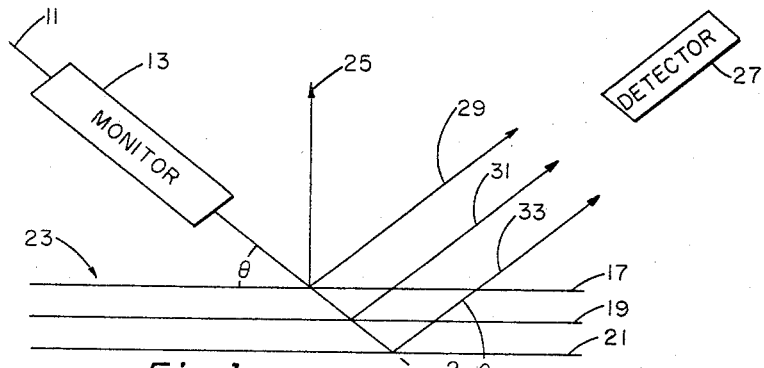
FIGURE 1 is a partial schematic drawing of principles of this invention, illustrating a first angle between a constant, monocromatic, incident, high flux, neutron beam and the reflecting planes of a crystal sample, and a second angle between the incident beam and a detector for the neutrons diffracted by the crystal planes.

In order to explain how the method and apparatus of this invention accomplish the function of determining the interatomic characteristics of a sample, reference is made to FIGURE 1, wherein is illustrated an incident monochromatic neutron beam 11 that passes through a collimater monitor 13 along an axis 15 that has an angle $\theta$ between the beam axis and the parallel reflecting planes 17, 19 and 21 of a sample refracting crystal 23, the scattering vactor therefrom being illustrated by arrow 25. A diffracted beam of neutrons enters detector 27 along various axes 29, 31 and 33 from the respective crystal planes at another angle, for example $2\theta$; and the energies of these scattered neutrons as they ricochet off the reflecting planes of the sample give an accurate picture of the sample's atomic structure.

Figure 2:
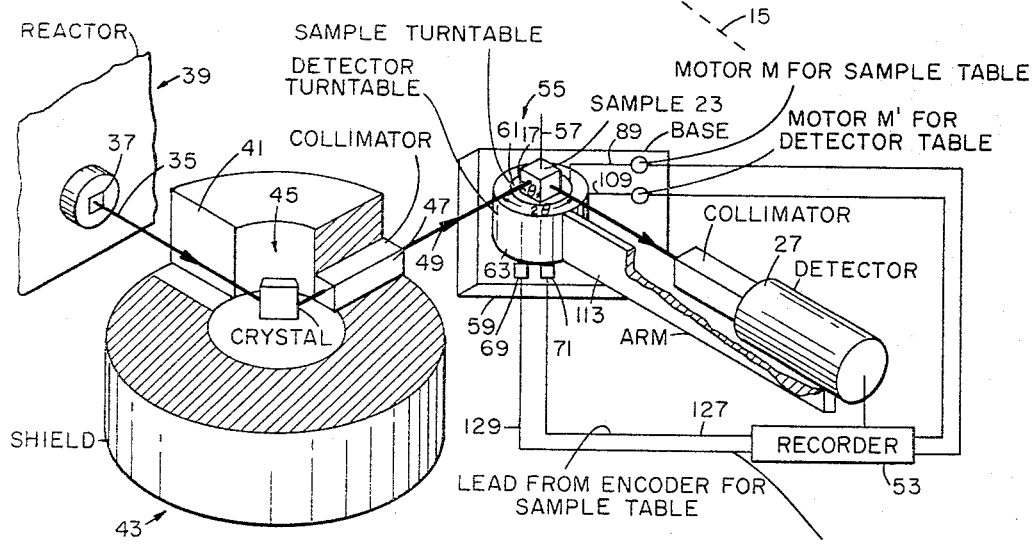
FIGURE 2 is a partial three-dimensional view of the elements of FIGURE 1 in the neutron spectrometer system of this invention.

Referring to FIGURE 2, the system of this invention for measuring the angles and numbers of the deflected neutrons, utilizes a high flux neutron beam 35 that passes from a beam hole 37 in the side of reactor 39 and through an opening 41 in shield 43 to a conventional wave length selector 45 at the center of the shield. Any suitable selector may be used, such as a crystal that breaks the relatively poly-energetic neutron beam into a monoenergetic beam, analogously to the way a prism separates white light into a spectrum. Collimator 47 keeps the desired monoenergetic beam 49 from spreading and directs it toward a target sample, such as crystal 23 having planes 19 and 21 parallel to the crystal face 17. The atomic structure of the sample thereupon focuses deflected neutrons from the beam 49 toward a counter detector 27. A recorder 53, such as a computer connected thereto, receives the data transmitted by the counter, while some of the neutrons in beam 49 pass on through the sample.

Advantageously, the detector 27 and crystal 23 have a common axis of rotation in a compact assembly 55 that maintains the axis vertical against a 40,000 inch-pound moment and a 2000 pound axial load.

In a practical embodiment shown in FIG. 3 the sample 23 and the detector 27 have a support forming a large annulus that accommodates coaxial precision encoders and independent drives for independent, continuously variable, accurately measurable relative rotations around a common vertical axis 57 over wide relative angles. To this end, base 59 supports both a rotatable table assembly 61 for the sample 23 and a coaxial, heavily cantilevered, rotatable table assembly 63 for the detector 27 by means of a preloaded, split race, four point contact bearing 65 forming a circular annulus 67 in a plane that accommodates stationary encoders 69 and 71 on axis 57.

Advantageously, the bearing 65 has a plurality of balls 77 uniformly arranged in an annular array around annulus 67. Two balls 77 are shown for ease of explanation. The bearing has inner race 79 and a split outer race 81 that are machined to provide four point contact with the balls 77. In the plane of FIGURE 3 these points of contact are evenly arranged on the circle of the ball with two contact points on the inner race and outer race respectively. The inner race 79 has an annular array of bolts 83 into the detector table 63 and the outer race 81 has an annular array of bolts 85 into base 59. Taking up on each outer bolt 85 against shims 87 of suitable thickness, suitably preloads the bearings 65 for a moment of 40,000 inch-pounds on cantilevered table 63 with a deflection of the target spindle 73 of only up to .004".

The inner table assembly 61 and the outer table assembly 63 have independent drives. To this end, a suitable worm shaft 89 of an electric motor M connected to inner, annular, stationary portion 107 of base 59 rotates selectively in either direction to rotate worm gear 91 on sample table 61 to rotate the table 61 in either direction around vertical axis 57 in an arc of 360°. Annular guide bearing 93 suitably provides low friction relative rotation between the inner table and an inner portion 107 of base 59.

The inner table assembly 61 also has an annular guide bearing 95 that permits relative low frictional rotation between crystal shaft spindle 97 and crystal table plate 99. The experimenter thus can choose to rotate the table plate 99 with its spindle 97 on axis 57, keep it stationary or hook-up the table 99 with arm 113 of detector table assembly 63 for common rotation.

Figure 4:
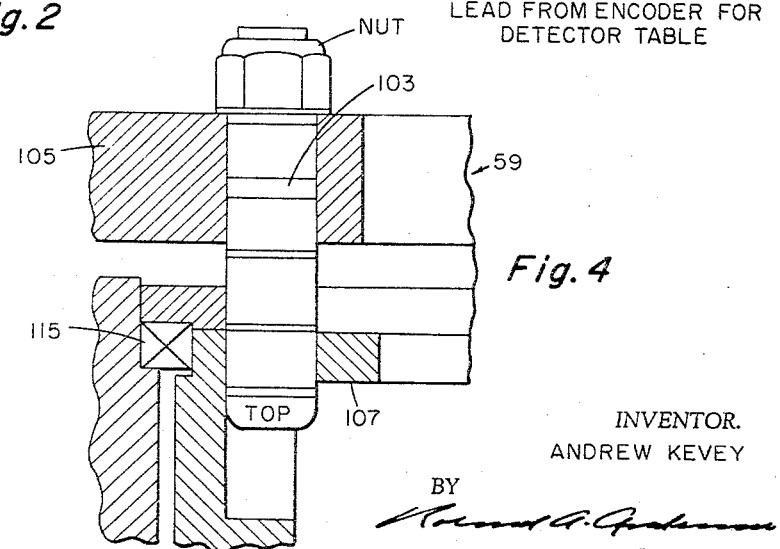
FIGURE 4 is a partial cross-section of the connection between the common base for the crystal sample and detector of FIGURE 3.

The arc of rotation of the detector table assembly 63 is limited to 300° by the connection of stationary inner portion 107 of base 59 to outer portion 105 of base 59, which is also stationary. This leaves an arc of 60° for expandable bolt 103, shown in FIGURE 4, that takes up between the first portion 107 of base 59 and a second outer portion 105 of base 59 for rigidly connecting the two portions.

Worm shaft 109 and its motor M', which rests on the stationary outer portion 105, rotates selectively in either direction against worm gear 111 to rotate detector assembly 63 and the detector 27 at the end of cantilevered arm 113 in either direction around axis 57. Suitable bearings 115 and 117 having their outer race fitted to detector table assembly 63 and their inner race fitted to inner portion 107 of base 59, provide relative low friction rotation between these two members. The bearings 115 and 117 are mounted between the rotatable outer table 63 and the stationary portion 107 of base 59 to assure a co-axial condition between encoders 69 and 71 and the inner and outer tables at all times in spite of any eccentricity in the bearing 65.

Encoders 69 and 71 are single turn, coaxial, optical encoders whose shafts 73 and 75 rotate directly with their respective table assemblies completely without back-lash or error by means of flexible couplings B and C. Both encoders are rigidly mounted to portion 107 of base 59 through respective annular arrays of bolts E and F.

Figure 5:
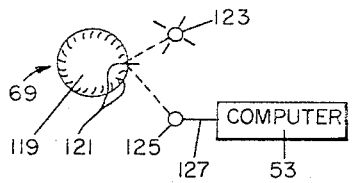
FIGURE 5 is a partial three-dimensional view of an encoder of FIG. 3.

Each encoder, comprises an optical, light reflecting disc 119 having 36,000 uniformly spaced indicia lines 121 on the edge of disc, as shown in FIGURE 5. Light 123 shines on the disc to reflect light into photoelectric cell 125 when the cell 125 is above the reflecting portion between two indicia lines 121. As the disc 119 rotates a line 121 under cell 125 the cell output decreases. The rotation of disc 119 thus presents light and dark portions to cell 125 thereby to produce pulses in the respective leads 127 and 129, one of which is shown in FIG. 5, whose number provides digital bits for recording, such as in computer 53. The recorder thereby records the exact position of encoders 69 and 71 and their respective table assemblies 61 and 63 within .01°, i.e., .6 min. or 36 seconds.

Referring to FIGURE 2, in one cycle of operation worm shafts 89 and 109 position their respective table assemblies 61 and 63 at given angles, such as $\theta$ and $2\theta$, so that the high flux, monoenergetic neutron beam 49 impinges on crystal face 17 at an angle $\theta$ with the beam axis and the refracted neutrons enter detector 27 at angle $2\theta$ with the beam axis. Advantageously a computer 53 receives the pulses from encoders 69 and 71 accurately to determine these angles. The computer 53 also receives the pulses from detector 27 to determine the number of neutrons refracted at the given angles.

The computer has a predetermined program responsive to its recording of the number of neutrons detected for automatically, precisely and independently rotating the two table assemblies 61 and 63 to appropriate continuously variable angles. To this end, the computer appropriately energizes motors M and M' at the appropriate polarity until the encoders relay information to the computer indicating the desired new table assembly angles. Thereupon, the computer rotates the table assemblies to new desired angles until an appropriate graph, such as shown in FIG. 6 is provided by the computer.

Figure 6:
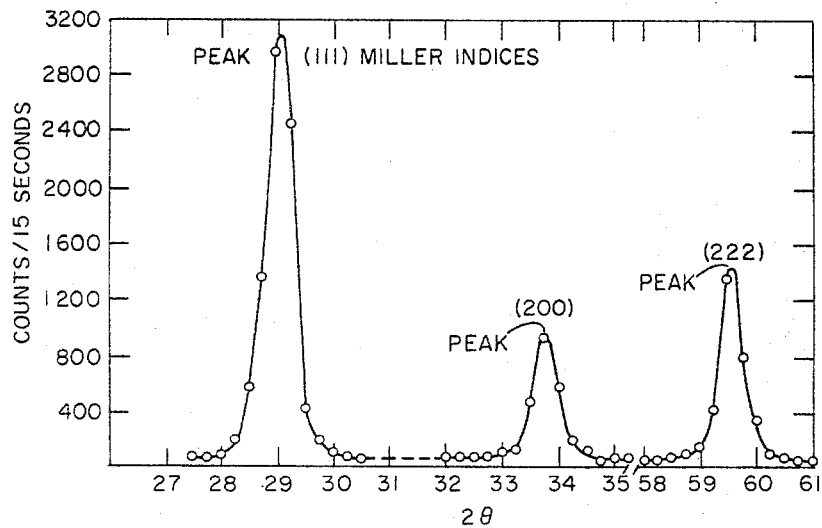
FIGURE 6 is a graphic illustration of the relative numbers of neutrons refracted by the sample relative to the angle $2\theta$ between the incident beam and detector table of FIGURE 2.

This operation has been accomplished automatically, efficiently by suitably programming the computer to move the respective tables sharply to define the peaks, such as shown in FIG. 6. Thus as the detected number of neutrons rises, the angle change is controlled by the computer to vary over very small increments and as this number decreases, the angle change is widened.

It is understood that the apparatus of this invention may be operated by hand independently, continuously variably to adjust the respective angles of the sample and detector assemblies relative to the incoming high flux, monoenergetic neutron beam. To this end, the output from detector 27 measures the number of refracted neutrons and the output from encoders 69 and 71 measure the respective table angles accurately, directly, and without back-lash. The motors M and M' can then appropriately and selectively be energized to provide the desired continuously variable angles between the sample and detector tables and the incoming beam.

This invention has the advantage of providing a compact, heavy duty, direct and accurate measurement of the angles over a wide range between an incoming neutron beam and a rotatable sample refracting crystal and a co-axially rotatable neutron detector. Moreover, the angles are independently and continuously variable. In actual practice, these angles have been selectively, independently and automatically varied with such accuracy that a computer has been employed that has been responsive to the neutrons detected immediately preceding the movement of the crystal sample and detector thus efficiently, automatically and rapidly to handle the data accumulated and accurately to determine the interatomic structure of a wide variety of sample elements and materials bombarded with a high flux beam of neutrons.

What is claimed is:

1. In a neutron spectrometer for determining the interatomic structure of a crystal sample having a crystal plane, a neutron source for directing a monomenergetic beam of neutrons against said crystal plane along a beam axis at a first angle to said crystal plane, and a detector for counting the number of neutrons scattered at a second angle between said beam axis and said detector, the improvement, comprising first means forming a large annulus in a plane for independently, coaxially and continuously variably rotating said sample and detector around a vertical axis in said annulus, and second means directly coupled respectively to said sample and detector on said vertical axis in said annulus for accurately, continuously variably and independently determining the rotation of said sample and detector relative to the axis of said beam of neutrons.

2. The invention of claim 1 in which said first means has an inner rotatable table assembly for said sample, an outer coaxial rotatable table assembly having a cantilevered arm for said detector, a base, and four point contact, preloaded, split-race bearing means between said base and said outer table assembly for supporting said outer table for rotation about said inner table assembly and the arrangement of said second means on said vertical axis.

3. The invention of claim 1 having a computer for actuating said first means to rotate said sample and detector in response to the detection of refracted neutrons by said detector.

4. The invention of claim 1 in which said second means has coaxial precision, optical encoders on said vertical axis for accurately and directly determining the relative rotation of said sample and detector without back-lash.

5. A method of determining the interatomic characteristics of a crystal sample by inelastic scattering analysis, comprising the steps of directing a high flux beam of neutrons of $7 \times 10^{14}$ neutrons/cm.$^2$/sec. against a crystal along a beam axis at an angle with the plane of the crystal, and varying said angle with a computer that records the number of neutrons scattered from said crystal at various angles to the axis of said beam, the change in angles by said computer being small when the number of scattered neutrons is high and being relatively larger when the number of scattered neutrons is low whereby the interatomic characteristics of the sample are determined accurately, efficiently and rapidly.

References Cited
UNITED STATES PATENTS

| | | | |
|---|---|---|---|
| 3,218,458 | 11/1965 | Furnas | 250—51.5 |
| 3,268,730 | 8/1966 | Van De Graaff | 250—83.1 X |
| 3,290,500 | 12/1966 | Bokhari et al. | 250—83.1 |

ARCHIE R. BORCHELT, *Primary Examiner.*

U.S. Cl. X.R.

250—51.5